(12) United States Patent
Petry et al.

(10) Patent No.: US 9,068,133 B2
(45) Date of Patent: Jun. 30, 2015

(54) PHOTONIC RADIOLYSIS OF WASTE MATERIALS

(75) Inventors: Dieter Peter Petry, Asuncion (PY); Aldo Mario Higinio Acosta Ayala, Asuncion (PY); Andres Anastacio Barrios Maciel, Asuncion (PY); Leon Isaac Vera Vera, Asuncion (PY)

(73) Assignees: Enerpy B.V., Venlo (NL); Enerpy S.A.C.I., Asuncion (PY)

( * ) Notice: Subject to any disclaimer, the term of this patent is extended or adjusted under 35 U.S.C. 154(b) by 220 days.

(21) Appl. No.: 13/579,526

(22) PCT Filed: Feb. 21, 2011

(86) PCT No.: PCT/NL2011/050121
§ 371 (c)(1),
(2), (4) Date: Nov. 13, 2012

(87) PCT Pub. No.: WO2011/102726
PCT Pub. Date: Aug. 25, 2011

(65) Prior Publication Data
US 2013/0055632 A1    Mar. 7, 2013

(30) Foreign Application Priority Data

Feb. 19, 2010   (PY) .................................... 06038/10
Feb. 23, 2010   (PY) .................................... 06404/10
Jun. 10, 2010   (WO) ................ PCT/NL2010/050355

(51) Int. Cl.
| C10L 5/46 | (2006.01) |
| C10B 19/00 | (2006.01) |
| C10B 53/00 | (2006.01) |
| C10B 53/02 | (2006.01) |
| C10L 5/42 | (2006.01) |
| C10L 5/44 | (2006.01) |

(52) U.S. Cl.
CPC . *C10L 5/46* (2013.01); *C10B 19/00* (2013.01); *C10B 53/00* (2013.01); *C10B 53/02* (2013.01); *C10L 5/42* (2013.01); *C10L 5/44* (2013.01); *Y02E 50/10* (2013.01); *Y02E 50/14* (2013.01); *Y02E 50/30* (2013.01)

(58) Field of Classification Search
CPC ............. C10L 5/46; C10L 5/44; C10B 19/00; C10B 53/00; C10B 53/02; Y02E 50/10; Y02E 50/14; Y02E 50/30
USPC .......................................................... 44/605
See application file for complete search history.

(56) References Cited

U.S. PATENT DOCUMENTS

| 4,437,896 A * | 3/1984 | Partanen ....................... 106/223 |
| 6,039,774 A | 3/2000 | McMullen |
| 2009/0018222 A1 | 1/2009 | Klepper |
| 2012/0291343 A1 * | 11/2012 | Schendel et al. ................ 44/605 |

FOREIGN PATENT DOCUMENTS

| JP | 57-036615 | 2/1982 |
| JP | 2001276791 | 10/2001 |
| JP | 2002-060628 | 2/2002 |
| JP | 2008-222569 | 9/2008 |
| JP | 2009-543926 | 12/2009 |
| WO | WO 2008/009644 A2 | 1/2008 |
| WO | WO 2008/027980 A1 | 3/2008 |
| WO | WO 2008/062242 A2 | 5/2008 |
| WO | WO 2010/006881 A1 | 1/2010 |
| WO | WO 2011/102726 A1 | 8/2011 |

OTHER PUBLICATIONS

International Search Report PCT/2011/050121; dated Jun. 14, 2011.

* cited by examiner

*Primary Examiner* — Cephia D Toomer
(74) *Attorney, Agent, or Firm* — TraskBritt, P.C.

(57) ABSTRACT

The invention relates to a method for producing coal, asphalt, liquid hydrocarbon, organic acids, methane gas and/or hydrogen from a waste material comprising: a) providing a waste material; b) subjecting the waste material to irradiation with low frequency macro waves, with a wavelength of between 700 nm and 1 mm, whereby the temperature is between 2050 C and 9000 C and the pressure is between 1.0 bar and 19.0 bar, thereby producing coal; c) optionally subjecting the residual materials in gaseous state from step b) to a physicochemical reaction in the presence of a solid metal identified as DPP B102, whereby the temperature is between 1800 C and 5000 C and the pressure is between 0.98 bar and 5.5 bar, thereby producing asphalt; d) optionally subjecting the residual materials in gaseous state from step b) or c) to a physicochemical reaction and/or condensation, whereby the temperature is between 1500 C and 7500 C and the pressure is between 0.96 bar and 200 bar, thereby producing liquid hydrocarbon; e) optionally subjecting the residual materials in gaseous state from step b), c) or d) to a physicochemical reaction in the presence of a solid metal identified as DPP D 102, whereby the temperature is between 500 C and 1500 C and the pressure is between 0.95 bar and 1.5 bar, thereby producing organic acids; f) optionally subjecting the residual materials in gaseous state from step b), c) d) or e) to an absorbent wash and cooling at room temperature, thereby producing methane gas and hydrogen, wherein
said waste material has a composition with a carbon content of 9-85%, a hydrogen content of 1-15% and an oxygen content of 0-65% based on dry weight of the material. The invention further relates to products obtainable by such methods and an apparatus for performing such methods.

29 Claims, 2 Drawing Sheets

PHOTONIC RADIOLYSIS OF WASTE MATERIALS

CROSS-REFERENCE TO RELATED APPLICATIONS

This is a national phase entry under 35 U.S.C. §371 of international Patent Application PCT/NL2011/050121, filed on Feb. 21, 2011, designating the United States and published in English as International Patent Publication WO 2011/102726 A1 on Aug. 25, 2011, which claims the benefit under Article 8 of the Patent Cooperation Treaty to Paraguay Patent Application Serial No. 06038, filed on Feb. 19, 2010; Paraguay Patent Application Serial No. 6404/2010, filed on Feb. 23, 2010; and PCT International Patent Application PCT/NL2010/050355, filed Jun. 10, 2010.

The invention relates to the field of waste processing. The invention further relates to generating useful products from waste materials.

The management of solid waste materials, particularly waste originating from consumption centres, the industrial and forestry sectors and others, generates a diversity of environmental and health problems. Problems associated with solid waste management include the increasing accumulation of waste, high expenses and the impossibility of waste materials to be eliminated. Solid organic and inorganic waste is mostly deposited in landfills specially designed to that end. The main inconvenience arising from the use of these landfills as a final destination for solid waste is the surface area occupied by them and the environmental and social problems generated, either because of pollution or because of the emission and release of gases from their decomposition. Furthermore, due to the cost of land and the aforementioned problems, landfills are located far from consumption centres which increases for instance transportation costs.

Other technologies for dealing with solid waste have been developed during the last few years, such as the high temperature incineration harnessing heat to generate electric energy. However, this technology generates high polluting emissions. Furthermore, during the application of high temperature incineration ashes are produced which are hard to eliminate and have to be stored in landfills.

Efforts have been made towards energetic recovery and transformation of solid waste of different origin, through the development of technologies such as gasification, anaerobic digestion, boiling or drying of solid waste and microwave irradiation of solid waste to replace the burning of solid waste in incinerators. With these technologies for instance steam or electricity are obtained. However, these technologies either require the use of fossil fuels or result in still large amount of residual waste materials. Other methods include biodigesters which convert organic matter into liquid fertilizer and energy in the form of biogas. During these processes amino acids are released, such as cystine, cysteine, lysine, methionine and ornithine. These amino acids are donors of sulphur, which can be converted into putrescines (cadaverine) leaving hexadecilmercaptane ($C_{16}H_{33}SH$) as a residue. Hexadecilmercaptane contains $H_2S$, hydrogen sufide, which is toxic as it blocks the central atom of iron in hemoglobin with a chocking effect similar to that of cyanide. Besides, when $H_2S$ is combusted, water and sulphur trioxide ($SO_3$) can be formed, subsequently resulting in the production of sulphuric acid ($H_2SO_4$) which is toxic when released into the environment.

Microwave irradiation of organic waste is used for processes of disinfection by internal heating of the organic waste, caused by internal friction as a result of the application of microwaves. This process does not allow recycling of the organic treated matter, but only disinfection and reduction of its volume. The resulting material, although with reduced volume, still needs to be deposited in for instance landfills.

Other approaches are different methods of pyrolysis in which the decomposition is performed with application of thermal energy to the material to be pyrolyzed. This thermal energy is applied in three ways transduction, convention and radiation. The heat source used is for instance heat of a burner. Also during pyrolysis, gases are produced which are released into the environment.

Therefore, there is an ongoing need for improved methods for treatment and conversion of solid waste.

It is an aim of the present invention to provide means and methods for producing useful product from waste material, preferably solid waste material, preferably organic waste material, more preferably solid organic waste material.

The invention provides a method for producing a useful product from a waste material comprising:
a) providing a waste material;
b) subjecting the waste material to irradiation with low frequency macro waves, with a wavelength of between 700 nm and 1 mm, whereby the temperature is between 205° C. and 900° C. and the pressure is between 1.0 bar and 19.0 bar, thereby producing coal;
c) optionally subjecting the residual materials in gaseous state from step b) to a physicochemical reaction in the presence of a solid metal identified as DPP B102, whereby the temperature is between 180° C. and 500° C. and the pressure is between 0.98 bar and 5.5 bar, thereby producing asphalt;
d) optionally subjecting the residual materials in gaseous state from step b) or c) to a physicochemical reaction and/or condensation, whereby the temperature is between 150° C. and 750° C. and the pressure is between 0.96 bar and 200 bar, thereby producing liquid hydrocarbon;
e) optionally subjecting the residual materials in gaseous state from step b), c) or d) to a physicochemical reaction in the presence of a solid metal identified as DPP D102, whereby the temperature is between 50° C. and 150° C. and the pressure is between 0.95 bar and 1.5 bar, thereby producing organic acids;
f) optionally subjecting the residual materials in gaseous state from step b), c) d) or e) to an absorbent wash and cooling at room temperature, thereby producing methane gas and hydrogen,
wherein said waste material has a composition with a carbon content of 9-85%, a hydrogen content of 1-15% and an oxygen content of 0-65% based on dry weight of the material.

A method according to the invention is herein also called "RMO method" or "RMO process". An apparatus used for performing a method according to the invention is herein also called "RMO" or "RMO apparatus".

The first major innovation of a method according to the invention is the application of the concept of efficiency and effectiveness of the impact of photon radiation waves. Thermal transduction and thermal convection is not applicable during a method of the invention, because the reaction vessels are not in direct contact with the heat source. This radiation is in the infrared range and higher frequencies generated in the combustion or heating the perimeter of thermal energy sources.

This radiation transmits a large stream of photons which is effectively concentrated in the waste material matter provided in cylindrical or spherical reaction vessel. The photon impact produces electromagnetic shock waves of such intensity that cracking or fragmentation of the molecule of the waste material is caused. As a result gasification of the waste material is initiated. A greater uniformity of the magnetic induction is achieved when compared with thermal transduction.

Thus, the mechanism responsible for breaking of chemical bonds in molecules of the waste material is photon energy. This process is herein also called photon targeted molecular fragmentation radiolysis.

A second aspect of this invention is that the radiolysed material is conveniently transmolecularized in the same process. The material in a gaseous state can react and be chemically combined into solid or liquid state with greater ease and security. Then all the material is properly treated in the RMO process in condensed gaseous state and then selectively precipitated obtaining useful products from materials that would otherwise have been contaminants.

Waste material as used herein is at least partly organic material containing carbon compounds, generally derived from animal and plant material. "Waste material" as used herein is defined as material which comprises 9-85% of carbon, 1-15% hydrogen and 0-65% oxygen based on dry weight of the material, and which has a sulphur content of 0-50%, a chloride content of 0-50%, a phosphor content of 0-50%, a bromine content of 0-50%, a boron content of 0-10%, a heavy metal content of 0-50%, based on dry weight of the material and is supplemented to 100% with other materials.

Preferably waste material comprises 10-80% of carbon, more preferably 10-75% of carbon based on dry weight of the material.

Preferably waste material comprises 2-12% of hydrogen, more preferably 3-10% of hydrogen based on dry weight of the material.

Preferably waste material comprises 0-50% of oxygen, more preferably 0-40% of oxygen based on dry weight of the material.

Preferably waste material has a sulphur content of 0-25%, more preferably of 0-15%, even more preferably 0-10%, even more preferably 0-5% based on dry weight of the material.

Preferably waste material comprises a chloride content of 0-25%, more preferably 0-15%, even more preferably 0-10%, even more preferably 0-5% based on dry weight of the material.

Preferably waste material comprises a phosphor content of 0-25%, 0-15%, even more preferably 0-10%, even more preferably 0-5% based on dry weight of the material.

Preferably waste material comprises a bromine content of 0-25%, 0-15%, even more preferably 0-10%, even more preferably 0-5% based on dry weight of the material.

Preferably waste material comprises a boron content of 0-5%, 0-3%, even more preferably 0-2%, based on dry weight of the material.

Preferably waste material comprises a heavy metal content of 0-25%, 0-15%, even more preferably 0-10%, even more preferably 0-5% based on dry weight of the material.

Batch size is preferably at least 200 kg waste material, more preferably at least 500 kg, more preferably at least 1500 kg.

Waste material preferably comprises at least 50% of organic material, preferably at least 60% of organic material, more preferably at least 70% of organic material. "Organic material" is herein defined as material that is derived from a living organism, such as an animal, a plant or a bacteria.

Examples of organic constituents of waste material include, but are not limited to, plant leaves and branches, fruit peel, oil, husks and shells of cereals and oilseeds, food leftovers, spurge, jatropha curcas plant and sugar cane bagasse, vegetable refuse, such as those of tobacco, cotton, sawdust, shaving, and all waste from the timber industry; all other organic waste from agro-industrial waste, pruning waste, weeds and all types of vegetable rests; solid waste of animal origin such as bones, manure, solid waste from the meat industry and any other type of waste of animal origin. In a preferred embodiment of the invention the waste material is organic waste material.

The waste material may contain inorganic components such as sulphur, chlorine, phosphor, bromine, boron and/or heavy metals, such as arsenic, cadmium, cobalt, copper, mercury, manganese, nickel, lead, tin and thallium. The content of sulphur in the waste material is preferably 0-50%, more preferably 0-25%, even more preferably 0-15% based on dry weight of the waste material. The content of chloride in the waste material is preferably 0-50%, more preferably 0-25%, even more preferably 0-15% based on dry weight of the waste material. The content of phosphor in the waste material is preferably 0-50%, more preferably 0-25%, even more preferably 0-15% based on dry weight of the waste material. The content of bromine in the waste material is preferably 0-50%, more preferably 0-25%, even more preferably 0-15% based on dry weight of the waste material. The content of boron in the waste material is preferably 0-10%, more preferably 0-5%, even more preferably 0-3% based on dry weight of the waste material. The content of heavy metals in the waste material is preferably 0-50%, more preferably 0-25%, even more preferably 0-15% based on dry weight of the waste material.

Examples of constituents of waste materials containing inorganic components include, but are not limited to plastics, paper, rubber, tires, natural and synthetic fabric, latex, diapers and disposable towels, disposed medicines, toxins and agricultural chemicals, tires, tetra pack containers and/or galvanized metals. A method according to the invention is particularly suitable for processing hazardous material.

The waste material is preferably solid, however, liquid waste can also be processed with a method of the invention. Essentially all organic material can be processed in a method according to the invention. Optionally, for reasons of rapidity and uniformity of the process, the volume of waste materials can be reduced or the waste material can be shredded before starting a method according to the invention. The size of the waste material after shredding is preferably 10-50 cm$^3$, more preferably 10-40 cm$^3$, even more preferably 15-20 cm$^3$. Furthermore, the waste material is preferably pre-dried in order to reduce the moisture content to a maximum of 35%, preferably a maximum of 30%, more preferably a maximum of 25%, more preferably a maximum of 20%, more preferably a maximum of 15%.

In a preferred embodiment, waste material that is processed into a useful product during the performance of a method of the invention is separated from waste material that is not processed into a useful product during the performance of a method of the invention but typically only sterilized. These two types of waste material are preferably not simultaneously subjected to a method according to the invention.

"A useful product" as used herein preferably is coal, asphalt, liquid hydrogen, organic acids, methane gas and/or hydrogen.

During step b) of a method according to the invention temperatures of between 205° C. and 900° C., and a pressure of between 1 bar and 19 bar, are generated. The temperature of the waste material during step b) is preferably between 205° C. and 850° C. In a preferred embodiment step b) of a method according to the invention is performed in the presence of cellulose or a cellulose derivative (reagent DDP A101), and/or a carbon compound (reagent DPP A 102), and/or water (reagent DDP A103).

Reagent DDP A101 is a compound selected from the group consisting of cellulose and cellulose derivatives. A "cellulose derivative" is herein defined as a compound that is derived from cellulose by a chemical process. Preferred examples of cellulose derivatives include, but are not limited to, cellulose esters, such as cellulose acetate and cellulose triacetate, cellulose ethers, such as methyl cellulose, ethyl cellulose, hydroxyethyl cellulose, hydroxypropyl cellulose, hydroxyethyl methyl cellulose, hydroxyethyl methyl cellulose and carboxymethyl cellulose. DPP A101 can be used in a concentration of between 1:100 and 1:10000 (kg reagent:kg dry weight of the waste material submitted to step b) of a method according to the invention). DPP A101 is preferably used in a concentration between 1:500 and 1:5000 (kg reagent:kg dry weight of the waste material submitted to step b) of a method according to the invention), more preferably of about 1:1000 (kg reagent:kg dry weight of the waste material submitted to step b) of a method according to the invention).

Reagent DPP A102 is a carbon compound, preferably microcrystalline carbon, more preferably pyrophorus microcrystalline carbon. "Pyrophorus microcrystalline carbon" is herein defined as carbon having a crystalline structure that can be seen only with a microscope and which spontaneously inflames on contact with air. In one embodiment DPP A102 is applied in portions, for example equal proportions, from the start of step b) of a method according to the invention until the desired concentration is reached when 50% of the process has been carried out. DPP A102 can be used in a concentration of between 1:100 and 1:10000 (kg reagent:kg dry weight of the waste material submitted to step b) of a method according to the invention). DPP A102 is preferably used in a concentration of between 1:500 and 1:5000 (kg reagent:kg dry weight of the waste material submitted to step b) of a method according to the invention), more preferably of about 1:1000 (kg reagent:kg dry weight of the waste material submitted to step b) of a method according to the invention). DPP A102 can be used to reduce the presence of oxygen in the atmosphere in the reactor and to prevent the formation of toxic oxides. Preferably its application reduces the presence of oxygen in the atmosphere during a method of the invention.

Reagent DPP A103 is water, preferably of atomized water. DPP A103 is preferably applied at the end of step b), before coal is discharged. Reagent DPP A103 preferably first acts as a reagent and subsequently becomes reduced. It furthermore preferably helps improve the stability of coal produced during step b). DPP A103 can be used in a concentration of between 1:1000 and 30:10000 (kg reagent:kg dry weight of the waste material submitted to step b) of a method according to the invention), preferably between 1:500 and 30:5000 (kg reagent:kg dry weight of the waste material submitted to step b) of a method according to the invention), more preferably of about 30:1000 (kg reagent:kg dry weight of the waste material submitted to step b) of a method according to the invention). In step b) of a method according to the invention preferably coal is obtained. Residual material of small molecules in gaseous state preferably goes to step c) of said method.

In step c) of a method according to the invention residual materials in gaseous state from step b) are subjected to a physicochemical reaction in the presence of a solid metal. During step c) of a method according to the invention the temperature decreases to between 180° C. and 500° C., and the pressure decreases to between 0.98 bar and 5.5 bar. The pressure during step c) is preferably between 0.8 bar and 1.2 bar. In step c) of a method according to the invention preferably asphalt is obtained. In a preferred embodiment step c) of a method according to the invention is performed in the presence of a hydrocarbon or a mixture of hydrocarbons (reagent DPP B101). The solid metal in step c) is further referred to as reagent DPP B102 unless otherwise specified.

Reagent DPP B101 is a hydrocarbon or a mixture of hydrocarbons. Said hydrocarbon is preferably selected from the group consisting of heavy hydrocarbons. A "hydrocarbon" is herein defined as a compound consisting essentially entirely of carbon and hydrogen. "Heavy hydrocarbon" is herein defined as a hydrocarbon having at least 15 carbon atoms. Said hydrocarbon is preferably selected from hydrocarbons in the range of between $C_{15}H_{32}$ and $C_{55}H_{112}$, more preferably in the range of between $C_{21}H_{44}$ and $C_{51}H_{104}$, more preferably in the range of between $C_{25}H_{52}$ and $C_{45}H_{92}$. In a preferred embodiment DPP B101 is a mixture of heavy hydrocarbons, which may contain any combination of heavy hydrocarbons falling in the ranges indicated above. DPP B101 can be used in a concentration of between 1:100 and 1:10000 (kg reagent:kg dry weight of the waste material submitted to step b) of a method according to the invention), preferably between 1:500 and 1:5000 (kg reagent:kg dry weight of the waste material submitted to step b) of a method according to the invention), more preferably of about 1:1000 (kg reagent:kg dry weight of the waste material submitted to step b) of a method according to the invention).

DPP B102 is a solid metal, preferably a metal selected from the group of transition elements, more preferably iron. In a preferred embodiment DPP B102 is a solid ferrous metal, preferably with a large surface area relative to the gas flow. A "transition element" is herein defined as any of the metallic elements within Groups 3 through 12 in the Periodic Table. DPP B102 is preferably added during step c). In another preferred embodiment, a solid metal, preferably a solid ferrous metal, is a constituent of a reaction vessel in which step c) is performed.

Residual material of small molecules in gaseous state preferably goes to step d) of said method.

In step d) of a method according to the invention residual materials in gaseous state from step c) are subjected to a physicochemical reaction and/or condensation. During step c) of a method according to the invention the temperature decreases to between 150° C. and 750° C. and the pressure decreases to between 0.96 bar and 200 bar. The pressure during step d) is preferably between 0.8 bar and 20 bar. In a preferred embodiment step d) of a method according to the invention is performed in the presence of a hydrocarbon or a mixture of hydrocarbons (reagent DPP C101), and/or an oxidizing agent (reagent DPP C102).

"Condensation" is herein defined as the change of the physical state of matter from gaseous phase into liquid phase.

Reagent DPP C101 is a hydrocarbon or a mixture of hydrocarbons. Said hydrocarbon is preferably selected from the group consisting of oily hydrocarbons. An "oily hydrocarbon" is herein defined as a hydrocarbon having a minimum of 8 carbon atoms and a maximum of 24 carbon atoms. In a preferred embodiment, said oily hydrocarbon is selected from hydrocarbons in the range of between $C_8H_{16}$ and $C_{24}H_{50}$, preferably in the range of between $C_{12}H_{26}$ and $C_{22}H_{46}$, most preferably in the range of between $C_{14}H_{30}$ and $C_{20}H_{42}$. A mixture of oily hydrocarbons, may consist of any combination of oily hydrocarbons falling in the ranges indicated above. DPP C101 is preferably used for the production of hydrocarbons resembling oil. Reagent DPP C101 already has its effect at a minimal pressure of 0.96 bar. DPP C101 can be used in a concentration of between 1:100 and 1:10000 (kg reagent:kg dry weight of the waste material submitted to step b) of a method according to the invention), preferably between 1:500 and 1:5000 (kg reagent:kg dry weight of the waste material submitted to step b) of a method according to the invention), more preferably of about 1:1000 (kg reagent: kg dry weight of the waste material submitted to step b) of a method according to the invention).

Reagent DPP C102 is an oxidizing agent. An "oxidizing agent" is herein defined as a substance that oxidizes another substance, being itself reduced in the process. Preferred examples of an oxidizing agent are chromium trioxide, hydrogen peroxide, nitric acid, sodium and potassium nitrate, chlorite or chlorate, or potassium permanganate. In a preferred embodiment DPP C102 is solid chromium trioxide ($CrO_3$). Reagent DPP C102 can be used in the production of fuels during step d) of a method of the invention. It is preferably used at the high end of the temperature and pressure ranges indicated below. DPP C102 can be used in a concentration of between 1:100 and 1:25000 (kg reagent:kg dry weight of the waste material submitted to step b) of a method according to the invention), preferably between 1:500 and 1:10000 (kg reagent:kg dry weight of the waste material submitted to step b) of a method according to the invention), more preferably of about 1:2500 (kg reagent:kg dry weight of the waste material submitted to step b) of a method according to the invention). During step d) of a method according to the invention temperatures are between 150° C. and 750° C., and pressure is between 0.96 bar and 200 bar. In step d) of a method according to the invention preferably liquid hydrocarbon is obtained.

Depending on reagent, pressure and temperature variations fuels such as methyl alcohol, diesel with cetanes, gasoline with octanes or other fuel varieties, solvents and explosive and anti-explosive additives are obtained. Residual material of small molecules in gaseous state preferably goes to step e) of said method.

In step e) of a method according to the invention residual materials in gaseous state from step d) are subjected to a physicochemical reaction in the presence of a solid metal identified as DPP D102. In a preferred embodiment, step e) of a method of the invention is performed in the presence of an organic acid solution of between 5% and 40% (reagent DPP D101 and/or an iron sulphate solution in a concentration of between 5% and 50% (reagent DPP D103).

Reagent DPP D101 is an organic acid solution of between 5% and 40%, preferably between 10% and 25%, more preferably of about 15%. An organic acid solution is preferably an aqueous organic acid solution. Preferred examples of an organic acid solution are an acetic acid solution, a formic acid solution, a citric acid solution, a butyric acid solution, a maleic acid solution and a benzoic acid solution. In a preferred embodiment DPP D101 is an acetic acid solution, more preferably an acetic acid solution of between 10% and 25%, most preferably an acetic acid solution of about 15%. Reagent DPP D101 can be used in a concentration of between 1:100 and 1:10000 (kg reagent:kg dry weight of the waste material submitted to step b) of a method according to the invention), preferably between 1:500 and 1:5000 (kg reagent:kg dry weight of the waste material submitted to step b) of a method according to the invention), more preferably of about 1:1000 (kg reagent:kg dry weight of the waste material submitted to step b) of a method according to the invention).

DPP D102 is a solid metal. Said metal is preferably selected from the group of transition elements. More preferably said metal is copper. In a preferred embodiment DPP D102 is metal wool, more preferably copper wool. DPP D102 can be used for cleaning of combustible gases during step e) of a method of the invention. It is preferably used if mercury is present, to capture mercury, thereby forming amalgam, which is insoluble in water. Optionally, mercury can be recovered by distillation.

Reagent D103 is an iron sulphate solution of between 5% and 50% (concentration of said solution in the reaction mixture), preferably between 10% and 40%, more preferably of between 15% and 30%. An iron sulphate solution is preferably an aqueous iron sulphate solution. In a preferred embodiment, if the concentration of the iron sulphate solution drops below 15% (concentration of said solution in the reaction mixture), additional iron sulphate solution is added to the reaction mixture. DPP D103 can be used for the cleaning of combustible gases during step e) of a method of the invention. It is preferably used to capture cyanide forming ferrocyanide, which is insoluble in water. DPP D103 can for instance be used to prevent the emission of cyanide in a product obtained with a method of the invention. During step e) of a method according to the invention temperatures are between 500° C. and 150° C., and pressure is between 0.95 bar and 1.5 bar. In step e) of a method according to the invention preferably organic acid is obtained.

Depending on reagent, pressure and temperature various organic acids are obtained. Depending on reagent variations, specific chemical reagents and temperature several organic acids used as fertilizers are obtained. Residual material of small molecules in gaseous state preferably goes to step f) of said method.

In step f) of a method according to the invention residual materials in gaseous state from step e) are subjected to an absorbent wash and cooling at about room temperature. Step f) enables the condensation of essential oils and light hydrocarbons and separation of these, together with other gaseous impurities of the fuel gas. During the absorbent wash gas obtained from step e) is compressed at 6-9 bars. Subsequently it is treated with water to obtain free $CO_2$, $H_2S$ and siloxane. In step f) of a method according to the invention methane gas ($CH_4$) with a preferred purity of between 50% and 92% and hydrogen (H), with a preferred purity of between 8% and 50% are for instance obtained.

Optionally, a thermal reduction of water, using heat in the absence of oxygen, is carried out between step d) and step e) of a method according to the invention. With this process hydrogen gas ($H^+$) and carbon dioxide ($CO_2$) are for instance generated.

The use of reagents during step b), c), d) and/or e) of a method according to the invention allows for a faster transformation of the waste material.

In a preferred embodiment the waste material is preheated or irradiated until an initial temperature of about 205° C. is reached, followed by a gradual increase in temperature to about 500° C. as a result of prolonged irradiation. More preferably the temperature of the waste material is increased to about 700° C. Most preferably the temperature of the waste material is increased to about 900° C.

In a preferred embodiment, a method of the invention is performed comprising all steps a-e as described above. Preferably, a method of the invention comprises first performing step a), followed by performing step b), followed by performing step c), followed by performing step d), followed by performing step e). In another preferred embodiment, a method of the invention is performed comprising all steps a-f as described above. Preferably, a method of the invention comprises first performing step a), followed by performing step b), followed by performing step c), followed by performing step d), followed by performing step e), followed by performing step f). Steps a), b), c), d) e) and f) are preferably initiated sequentially. After the initiation of the different steps, the physicochemical reactions of these steps will proceed at least partly after the following step has been initiated. For instance, after step d) has been initiated, the physicochemical reaction of step d) is initiated and the physicochemical reaction of steps c) and/or d) may still continue. Therefore, in a preferred embodiment, a method of the invention comprises first performing step a), followed by initiating step b), followed by initiating step c), followed by initiating step d), followed by initiating step e), followed by initiating step f).

Depending on the waste materials and depending on the reagents used, it is possible to omit one of more of these steps. This is for instance the case when specific, homogenous organic material is to be processed. A method of the invention can for instance be performed comprising steps a, b, e and f as described above, resulting in the production of coal, organic acids and gas. In another embodiment a method of the invention is performed comprising steps a, b, and f as described above, resulting in the production of coal and gas. In yet another embodiment, a method of the invention is performed comprising steps a, b, c and f as described above, resulting in the production of coal, asphalt and gas. In yet another embodiment, a method of the invention is performed comprising steps a, b, c and d as described above, resulting in the production of coal, asphalt, organic acids and liquid hydrocarbons.

In another aspect of the invention a method for the treatment of waste materials is provided, comprising only steps a and b as described above, comprising providing a waste material, and subjecting the waste material to irradiation with low frequency macro waves, with a wavelength of between 700 nm and 1 mm, whereby the temperature is between 205° C. and 900° C. and the pressure is between 1.0 bar and 19.0 bar, wherein said waste material has a composition with a carbon content of 9-85%, a hydrogen content of 1-15% and an oxygen content of 0-65% based on dry weight of the material. Preferably said irradiation is performed in the presence of cellulose or a cellulose derivative (reagent DDP A101), a carbon compound, preferably microcrystalline carbon, more preferably pyrophorus microcrystalline carbon (DDP A102), and water (DDP A103).

In step b) of a method according to the invention, irradiation with low-frequency macro waves, with a preferred wavelength ranging from 700 nm to those corresponding to the infrared, i.e. a preferred wavelength of between 700 nm and 1 mm, is applied to the waste. Long biological chains and macromolecules of organic waste materials are broken down into smaller molecules. The frequency of the macro waves applied is preferably between 0.1 Tera-Hz and 1000 Tera-Hz, more preferably between 0.3 Tera-Hz and 500 Tera-Hz, even more preferably between 0.8 Tera-Hz and 100 Tera-Hz. Macro waves are preferably applied for one to four hours. The intensity of irradiation is between $1.0 \times 10^6$ eV (electronvolt) and $20.0 \times 10^6$ eV, more preferably between $2.0 \times 10^6$ eV and $10.0 \times 10^6$ eV, more preferably between $3.0 \times 10^6$ eV (electronvolt) and $6.2 \times 10^6$ eV per hour per kilogram of organic dry material. During step b) of a method according to the invention temperatures of between 205° C. and 900° C., and a pressure of between 1 bar and 19 bar, are generated.

As is known in the art, pyrolysis is performed by the application of thermal energy to material in three possible ways, by conduction, convection and radiation. Preferably in a method of the invention a heat source supplies the thermal energy. In a preferred embodiment a heat source is a burner. However, thermal energy can also be caused by various other sources.

In a method of invention, heat sources are preferably located peripherally whereby the reaction vessel or vessels are not in direct contact with the heat source. As a result, thermal conduction and convection is limited and radiation is essentially the only source of thermal energy. This radiation has a preferred wavelength ranging from 700 nm to those corresponding to the infrared. The frequency of the irradiation can be varied by varying the heat produced by the heat source. For instance, higher frequencies are generated if heating by the thermal energy source is increased.

In a preferred embodiment, a reaction vessel used in a method of the invention is of cylindrical or spherical shape. A reaction vessel further preferably has a double metal wall, whereby the two walls are not in direct heat transducing contact with one another. The primary source of radiation is preferably a heat source, such as a fire or a boiler. The outer metal wall of a reaction vessel is heated by the primary heat source and as a result is itself a secondary source of radiation. The outer wall of a reaction vessel blocks the transfer of thermal energy by conduction and convection. However, photon radiation from the outer wall also passes through the inner wall of the reaction vessel. Therefore, the material contained within the inner wall of said reaction vessel is irradiated by both the inner wall and the secondary radiation source, i.e. the outer wall of the reaction vessel.

This radiation transmits a large stream of photons effectively concentrated in the waste material contained in a, preferably cylindrical or spherical, reaction vessel. This produces electromagnetic waves of such intensity that causes cracking or chemical fragmentation of molecules of the waste material, whereby gasification of the waste material is progressively started. A greater uniformity of electromagnetic waves is achieved by radiation when compared to conduction or convection of thermal energy. Thus, the mechanism responsible for breaking of chemical bonds in molecules of the waste material is photon energy. This process is herein also called photon targeted molecular fragmentation radiolysis.

During irradiation preferably a temperature of between 205° C. and 900° C. is reached within a reaction vessel used in a method of the invention. Molecular fragmentation is typically initiated when the temperature of the waste material contained within a reaction vessel reaches about 205° C. Irradiation is preferably produced by a heat source heated to at least 205° C., more preferably at least 500° C., more preferably at least 700° C. and most preferably at least 900° C.

A method of the invention is highly efficient and energy-conserving because the power transmitted by the radiation increases exponentially with the temperature of the emitting heat source. In contrast, in the case of energy transmitted by convection it maintains an almost linear relationship with temperature.

During the performance of a method according to the invention the content of the apparatus in which said method is performed is preferably essentially isolated from the exterior environment, and there is a humidity of between 80% and 100%, preferably between 90% and 100%, more preferably the humidity is between 95% 100%. The oxygen content is preferably below 5%, more preferably below 2%, even more preferably below 0.5% during said method. The process can be realized using the pressure of gas, such as steam, generated in the process, in this case pressure builds up to the upper part of the pressure ranges indicated above. Alternatively, during the process combustible gases can be aspirated, in this case during the process the pressure is in the lower part of the pressure range indicated above.

With a method of the invention long biological chains and macromolecules of the waste are broken down into smaller molecules. Macro waves of low frequency with the application of focalized photonic radiolysis are applied that penetrate deep into the intermolecular space resulting in the rupture of the long biological chains. A method of the invention offers a solution for the processing of waste. With such method the pollution of communities with toxic substances which are emitted during the burning and incineration of waste are prevented. The technology provided by the invention supports zero waste policies which aim to reduce garbage and pollution by reusing products. It enables alternative waste management, to preserve materials, save energy and create sources of fuels and other useful products. Products obtained with a method of the invention are essentially free of toxic substances. The process allows for recycling of over 96% of waste materials and preferably does not generate dangerous residues.

A method of the invention comprising at least steps a) and b) as described above is particularly suitable for total disinfection and sterilization of solid waste, including, but not limited to, for instance hospital waste. One advantage of such method is that during disinfection and sterilization production of waste or substances harmful to the environment is prevented. Infectious germs which could cause diseases or epidemics are not able to survive the method. Another advantage of said method is that biological decomposition and putrefaction of the treated materials is prevented, thereby preventing typical nauseating odors of decomposition of organic matter. Therefore, a method according to the invention is also particularly suitable for non-destructive treatment of organic waste. A method according to the invention can further be used for precipitation of harmful substances. It enables an efficient precipitation of polluting elements, thus eliminating harmful substances by incorporating them into one or more products obtainable with a method according to the invention, such as fuel. With such a method the use of filters which later become waste is prevented.

In one aspect, a method according to the invention further comprises the precipitation of inorganic substances such as sulphur, chlorine, phosphor and heavy metals, such as arsenic, cadmium, cobalt, copper, mercury, manganese, nickel, lead, tin and thallium, during step b) and/or step c) and/or step d) and/or step e). The precipitation of such substances is preferably performed using alkali-reagents which are added to the reaction mixture.

In this aspect of the invention, if during step b) precipitation of sulphur, chlorine, phosphor and heavy metals is carried out, alkali-reagents are preferably added during this step, for instance by addition or by replacing the aqueous environment of step b) with an aqueous solution containing alkali reagents, in order to transform coal pollutants into insoluble salts and crystals. The temperature of the aqueous solution containing alkali reagents preferably ranges between 20° C. and 60° C. This allows all semi-volatile and volatile substances to precipitate. Sulphur, chlorine and/or phosphor, are mixed with alkali from the aqueous solution, forming insoluble salts and chemically stable crystals. These insoluble salts and crystals are precipitated and removed in the aqueous solution. On the contrary, in incineration or pyrolytic processes of waste treatment, these molecules are released with high temperatures into the environment, or, often incompletely, filtered out. The filters subsequently become solid waste.

Gaseous material from step b) of a method of the invention preferably becomes the input of step c). Said input may contain heavy metals originally contained in the waste material. In this case, the physicochemical process carried out in step c) results in the incorporation of the heavy metals in the asphalt. If phosphorylated, sulphurated or chlorinated compounds are still present during step c), an additional precipitation of sulphur, chlorine and/or phosphor is carried out during step c) of a method of the invention preferably by adding alkali-reagents, for instance by addition or by replacing the aqueous environment by an aqueous solution containing alkali reagents, in order to transform asphalt pollutants into environmentally inert crystal molecules. The waste material, with temperatures ranging from 200° C. to 300° C., is added to the alkali solution, which temperature preferably range between 20° C. and 50° C. This enables all semi-volatile and volatile substances to be precipitated. Sulphur, chlorine and/or, phosphor are mixed with the alkali of the solution, thereby forming insoluble salts and chemically stable crystals. These insoluble salts and crystals are precipitated and removed in the aqueous solution. The chemical reaction between inorganic substances and alkali-reagents in solution automatically starts by chemical affinity, no further addition of energy is required.

Gaseous material from step c) of a method according to the invention preferably is the input of step d). If phosphorylated, sulphurated or chlorinated compounds are still present during step d), an additional precipitation of sulphur, chlorine and/or phosphor is carried out during step d), preferably by adding alkali-reagents, for instance by addition or by replacing the aqueous environment with an aqueous solution containing alkali reagents in order to transform liquid hydrocarbon pollutants into environmentally inert crystal molecules. The chemical reaction between inorganic substances and alkali-reagents in solution automatically starts by chemical affinity, no further addition of energy is required. The material processed during step d), with temperatures ranging from 150° C. to 250° C., is added to the alkali solution, which preferably ranges between 20° C. and 50° C.

Residual gaseous material from step d) of a method according to the invention preferably is the input of step e). If phosphorylated, sulphurated or chlorinated compounds are still present, another additional precipitation of sulphur, chlorine and/or phosphor is carried out on the discharge of step e) preferably by adding alkali-reagents, for instance by addition or by replacing the aqueous environment with an aqueous solution containing alkali-reagents in order to transform the pollutants into environmentally inert crystal molecules. The material processed during step e) of the method, with temperatures between 90° C. and 150° C., is added to the acid environment, which preferably is between 20° C. and 50° C., and sulphur, chlorine, phosphor, nitrogen, boron and bromine radicals are reacted with alkalis from the solution, forming insoluble, chemically stable salts and crystals.

Heavy metals, when present in the waste material, precipitate mainly in the asphalt during step c) of a method of the invention. Heavy metals that do not precipitate in asphalt, precipitate during the following steps in aqueous solution containing alkali-reagents. Preferably, no chemical reactions take place between the heavy metals and alkali reagents. These heavy metals can be separated from the solution with alkali reagents by for instance electrolysis.

Alkali-reagents are selected by their ability to chemically react with the inorganic substances which results in precipitation of these substances. Preferred examples of reagents that can be used for the precipitation of inorganic substances include, but are not limited to, calcium hydroxide ($Ca(OH)_2$), sodium hydroxide (NaOH) and potassium hydroxide (KOH). Calcium hydroxide is preferably used for precipitation of sulphur. Calcium hydroxide and/or sodium hydroxide are preferably used for precipitation of chloride. Calcium hydroxide, ammonium hydroxide and/or potassium hydroxide are preferably used for precipitation of phosphor. Alkali reagents are preferably used at concentrations of between 15% and 27%. In case other hazardous substances are detected in the solid organic waste material other reagents can be used. The necessary reagents can be determined for every hazardous substance.

Boron has a melting temperature of 2050° C. and a boiling temperature of 2550° C. These temperatures are much higher than those reached in during the RMO process. Therefore, boron is discharged with coal. The presence of boron in drinking water in the form of dissolved salts is dangerous but in general not hazardous to the environment.

A method according to the invention comprising the precipitation of inorganic substances allows for the deactivation of compounds and polluting materials and neutralization of their active or environmentally aggressive components in the consecutive method steps. The end product is delivered at room temperature, whereby the creation of new toxic compounds, which usually occurs during incineration, is prevented. The precipitation of sulphur, chlorine, phosphor, bromine and/or boron and heavy metals during step b) and/or step c) and/or step d) and/or step e) of a method according to the invention allows for treatment of chemically and/or biologically polluted materials such as pathological hospital waste and chemically polluted materials or substances such as waste from the chemical industry. Furthermore, it allows for the treatment of chemically and/or biologically polluted materials such as pathological hospital waste and chemically polluted materials or substances such as waste from the chemical industry, phytosanitary and zoosanitary substances and persistent organic substances included in the Stockholm Agreement. Persistent organic pollutants (POP) are chemical products containing certain toxic properties and are degradation-resistant. This makes them particularly harmful for human health and the environment. A method according to the invention can for instance be applied to waste material comprising polychlorinated biphenyls (PCBs), aldrin ($C_{12}H_8Cl_6$), chlordane ($C_{10}H_6Cl_8$), dieldrin ($C_{12}H_8Cl_6O$), pentabromodiphenyl ether ($C_{12}H_2Br_8O$), chlordecone ($C_{10}Cl_{10}O$), hexabromodiphenyl ($C_{12}H_4Br_6$) and hexachlorocyclohexane ($C_6H_6Cl_6$). A method according to the invention can further be used for the elimination of disused tires, thereby recovering sulphur, microcrystalline coal, steel, asphalt, and liquid and gaseous hydrocarbons, and for recycling tetra pack containers, thereby recovering metal foils, preferably aluminum foils, asphalt and liquid and gaseous hydrocarbons. Coal and steel can for instance be separated by mechanical or magnetic means. Coal and aluminium are for instance separated by mechanical means. A method according to the invention can for instance further be applied for degalvanizing galvanized metals without emission of toxic gases with zinc oxide-related neuroplegic effects. Said toxic gases disseminate during incineration of galvanized metals and they are difficult to control and eliminate. Metal compounds obtained during degalvanization in step b of a method of the invention, for instance zinc oxide, can be incorporated into asphalt in step c.

A product obtainable with a method according to the invention is also provided.

In one embodiment the invention provides a product obtainable from step b) of a method according to the invention, wherein said product is coal. Coal is herein defined as a dark brown to black graphitelike material, consisting of amorphous carbon with various organic and optionally some inorganic compounds. Coal can be used as a fuel. Typically, coal obtained with a method of the invention comprises between 40% and 95% of fixed carbon, preferably between 50% and 92% of fixed carbon, more preferably between 60% and 88% of fixed carbon. Coal obtained with a method of the invention typically comprises between 2% and 40% of volatile substance, preferably between 3% and 35% of volatile substance, more preferably between 6% and 30% of volatile substances. Said coal typically comprises between 1% and 30% of ashes, preferably between 3 and 25% of ashes, more preferably between 6% and 20% of ashes.

In a preferred embodiment the invention provides a product obtainable from step c) of a method according to the invention, wherein said product is asphalt. Asphalt is herein defined as a dark brown to black highly viscous hydrocarbon. Asphalt is generally produced from the residue left after the fractional distillation of crude oil or obtained from natural sources such as asphalt lakes in for instance Trinidad. The predominating constituents of asphalt are bitumen. Asphalt is used for road surfacing, for roofs, coatings, floor tilings, and for waterproofing, and in industrial products.

Asphalt cement is the residue from the distillation process of crude oils. It is also called bitumen. Bitumen are a mixture of numerous aromatic, paraffinic hydrocarbons and polycyclic compounds containing sulphur, nitrogen and oxygen; almost entirely soluble in carbon sulfide. Hydrocarbons can be divided into two groups: acyclic or open-chain and cyclic or closed-chain. In turn, open-chain hydrocarbons are subdivided, according to whether they contain only single bonds, double bonds or triple bonds, in saturated hydrocarbons or paraffins, ethylene hydrocarbons or olefins, and acetylenic hydrocarbons or alkynes. Cyclic hydrocarbons are in turn subdivided into alicyclic and benzenic, according to whether they lack or have a benzene ring. Both groups, in turn, can be subdivided into monocyclic and polycyclic. Within the polycyclic benzenic group there can be two or three condensed benzene rings, which are called naphtalenic and anthracenic, respectively.

Hydrocarbons in asphalt form a colloidal solution in which molecules of the heaviest hydrocarbons (asphaltenes) are surrounded by molecules of lighter hydrocarbons (resins), without a separation between them, rather a transition. Oils occupy the remaining space. Asphaltene molecules have functional and radical groups, enabling the formation of micellae when certain concentrations of asphaltenes are present in the hydrocarbon. The most representative functional groups are carbonyl (—CO—), carboxylic (—COO—), phenol (Ar—OH) and hydroxyl (—OH) groups, which are in the inner side of the micellae. In the asphaltenes all metals contained in the oil are present, for instance Ni, V, Fe, Co, Mn, together with oxygen, sulphur and nitrogen. 80% to 85% of asphaltenes are carbon atoms. The C:H ratio is found to be between 0.8 and 0.87. The heteroatom content can be between 5% and 11%-14%.

Asphaltenes are the product of resin condensation. Asphaltenes are responsible for the structural and hardness characteristics of asphalt. Resins are the raw material for the formation of asphaltenes and plasticize asphaltene molecules. Resins have a very good solubility in hydrocarbons from crude oil and asphalt, favoring the formation of a stable asphaltene-resin-asphaltene system. As a result of the resin reaction, dehydrogenation and condensation processes occur with the elimination of water, hydrogen, sulphuric acid and ammoniac molecules and the subsequent formation of asphaltenes. Resins have more branches than asphaltenes, therefore, they are less compact and more disorderly. The content of polar groups (hydroxyl, carboxyl) and a few functional groups guarantee the emulsifying power of resins. Depending on the concentration of asphaltenes and on the temperature, resins in asphalt can be found both in the dispersed phase and in the dispersing medium of the system. Resins provide the agglutinating properties of asphalt.

Oils are the dispersing medium of asphalt. Its solubility capacity is determined by its chemical composition, often through the paraffin-naphthalene hydrocarbon and aromatic hydrocarbon ratio, and its molecular weight. Generally, paraffin-naphthalene hydrocarbons, aromatic and naphthalene hydrocarbons of paraffin side chain form a dispersed phase in the oils under determined temperatures. The oils give the appropriate consistency to asphalt to make them workable.

Asphalts used in paving are, mainly, those resulting from refining crude oil. The quality of the asphalt thus obtained is influenced by the refining process followed. When the distillation process is controlled, so that there are no chemical transformations, so called direct distillation occurs and the products obtained are asphaltic residual oils or direct distillation asphalt.

Oxidized, blown or insufflated asphalt is obtained through the passage of oxygen through asphalt at high temperature and pressure. Its use in paving is restricted since it is hard, brittle, with low-ductility and shorter durability than the asphalt obtained by direct distillation.

For road paving asphalt cement, diluted asphalt or asphalt emulsions can be used. Asphalt cement is asphalt specially prepared for its direct use in paving. Asphalt obtained from natural asphalt is indicated by the acronym NAC and asphalt obtained from oil is indicated by the acronym AC. They are semi-solid at room temperature and need to be heated in order to reach an appropriate consistency for use in paving. They are flexible, durable, agglutinated, and impermeable and have a high resistance to most acids, salts and alkalis. Asphalt cement from oil is classified according to its degree of consistency determined by penetration assays. The following types are specified: 40-50, 50-60, 60-70, 70-85, 85-100, 100-120, 120-150 and 150-200. The lower the numeric designation of classification, the "harder" the natural asphalt cement is.

Diluted asphalt can be obtained from soft asphaltic waste in which distillation has been suspended without extracting all oils and gasoil, or from hot melted asphalt cement with different solvents from oil distillation, such as naphtha, kerosene, gasoil or lubricating oils. It is used when it is necessary to eliminate the heating of oil asphalt cement or to use a moderate heating in paving. The total evaporation of the solvent after the application of the diluted asphalt leaves the asphalt cement as residue which then develops the necessary cement properties. This evaporation is called diluted asphalt curing. The classification of diluted asphalt is carried out according to the time of its curing. If the solvent is of the naphtha or gasoline type, rapid-curing asphalt is obtained. If the solvent is kerosene, medium-curing asphalt is obtained. If the solvent is light oil of relatively little volatility, slow-curing asphalt is obtained. Rapid curing, medium-curing and slow curing asphalt are indicated RC (Rapid curing), MC (Medium Curing) and SC (Slow Curing) respectively, followed by a number indicating the degree of kinematic viscosity measured in centistokes.

Asphalt emulsions are colloidal dispersions of an asphaltic phase in an aqueous (direct) phase, or a dispersed aqueous phase in an asphaltic (inverse) phase. Asphalt emulsions are obtained by combining water with heated asphalt, in an intensely agitated medium in the presence of emulsifiers, which grant stability to the asphalt by favoring dispersion and providing a protective film around bitumen globules, thus maintaining them in suspension. The emulsifiers or tensoactive products used in the manufacturing of the emulsions are divided into two categories, anionic and cationic. Diluted asphalt and the softest asphalt cement are the most frequently used in the manufacturing of emulsions. However, more modern procedures also consider harder asphalt cement. Cationic emulsions may break by chemical reaction between the emulsifier and the aggregate and by water evaporation. This phenomenon of water bituminous material separation is called emulsion rupture. In anionic elements, emulsion rupture occurs mainly by water evaporation. According to the break speed, asphalt emulsions are classified into rapid rupture emulsion (RR), medium rupture emulsion (MR) and slow rupture emulsion (SR).

Asphalt concrete surfaces consist of mixtures of bitumen material with inert aggregates, which, depending on the mixing temperature, are classified into hot mix asphalt concrete and cold mix asphalt concrete. More than 90% of paved roads are executed with flexible pavements, so the technique used for said type of pavement is widely extended and developed. Bituminous materials represent a great part of the cost of flexible pavements. Furthermore, the fact that bituminous materials are mostly derived from oil makes their price dependent on crude oil prices and dollar prices. In the last few years these have had unpredictable variations. Asphalt obtained by a method according to the invention constitutes an environmentally sustainable, low-cost alternative in the constitution of paving for the construction of paved roads. The applicability of the material obtained from a method according to the invention has been determined by its chemical and physical properties.

The same analysis methodology to verify the quality for industrial use established for asphalt cement obtained from crude oil are preferably used to determine the composition, characteristics and performance level of asphalt obtained with a method according to the invention. The characteristics have been determined using the standard tests of the American Association of State Highway and Transportation Officials (AASHTO). The AASHTO standard tests are well known for a person skilled in the art and all AASHTO standards and test methods can be found in the "Standard Specifications for Transportation Materials and Methods of Sampling and Testing" ($30^{th}$ edition published in 2010) and "AASHTO Provisional Standards" of the AASHTO.

Asphalt obtained by a method according to the invention is formed from a waste material that preferably comprises at least 50%, more preferably at least 60%, even more preferably at least 70% of organic material and/or biomass. It may optionally contain inorganic impurities. It has the possibility of replacing traditional bituminous products obtained from oil. Materials which can be used for obtaining asphalt according to the invention include, but are not limited to, organic solid waste, industrial waste such as waste from the oil industry, husk and chaff, waste from the wood industry such as sawdust, shavings, waste from the agricultural and wood production and biomass.

Asphalt obtained by a method according to the invention has a physical and mechanical behavior comparable to that of oil asphalt cement and a chemical configuration equivalent to that of oil asphalt cement. The physical and mechanical properties are detailed below.

Asphalt obtained by a method according to the invention typically has a solubility in carbon tetrachloride of between 95 and 100%, preferably between 98 and 100%, more preferably of between 99.4% and 99.8%, for instance of about 99.6% as determined by the AASHTO T 44 standard test for solubility of bituminous materials in organic solvent. It preferably has an ash content of between 0.1 and 2%, more preferably between 0.2 and 1.0%, most preferably of between 0.3% and 0.5%, for instance of about 0.4% as determined by the AASHTO T 111 standard test for determining inorganic matter or ash in bituminous materials. Asphalt obtained by a method according to the invention preferably has a negative first and second Oliensis spot test as determined by the AASHTO T 102 standard test for determining asphaltene instability of asphaltic materials.

Asphalt obtained by a method according to the invention typically has a specific weight of between 0.98 and 1.1 grams/cm$^3$, more preferably between 0.99 and 1.05 grams/cm$^3$, even more preferably between 1.00 and 1.03 grams/cm$^3$, most preferably of about 1.017 grams/cm$^3$ as determined by the AASHTO T 228 standard test for determining specific gravity of semi-solid bituminous materials.

Asphalt obtained by a method according to the invention typically has a penetration index of between −1.15 and −1.25, preferably between −1.17 and −1.23, more preferably of about −1.21.

The classification of asphalt obtained by a method according to the invention preferably corresponds to 50-60 penetration grade asphalt cement.

Asphalt obtained by a method according to the invention preferably has a ductility of between 108 and 120 cm, more preferably of between 110 and 115 cm, more preferably of about 112 cm, as determined by the AASHTO T 51 standard test for ductility of asphalt materials.

Asphalt obtained by a method according to the invention preferably has a softening point of between 47° and 53°, more preferably of between 48.5 and 51°, most preferably of about 49.2°, as determined by the AASHTO T 53 standard test for softening point of asphalt (bitumen) in ethylene glycol.

Preferably the thermal susceptibility of asphalt obtained by a method according to the invention is comparable to the values indicated in table 1, as determined by the AASHTO T 72 standard Saybolt Furol viscosity test.

TABLE 1

Indication of thermal susceptibility of asphalt obtained by a method according to the invention.

| Temperature (° C.) | Viscosity |
|---|---|
| 125 | 276 |
| 135 | 175 |
| 145 | 131 |
| 155 | 92 |
| 165 | 65 |

The parameters of asphalt obtained by a method according to the invention determined in the above mentioned tests fulfil the requirements established for its use in flexible pavement asphalt concrete. The temperature for mixing said asphalt with stony aggregations in order to obtain asphalt concrete suitable for use in pavement, ranges between 155 and 165° C. and the compacting value ranges between 142 and 145° C.

Asphalt obtained by a method according to the invention preferably has an inflammation point of between 230 and 250° C., more preferably between 235 and 245° C., most preferably of about 240° C., as determined by the AASHTO T 48 standard test for flash and fire points by Cleveland Open Cup Tester.

Asphalt obtained by a method according to the invention preferably has a loss due to heating of between 0.5 and 1.0%, more preferably between 0.55 and 0.75%, most preferably of about 0.64% as determined by the AASHTO T 179 standard test for effect of heat and air on asphalt materials (Thin-Film Oven Test).

Asphalt obtained by a method according to the invention preferably has a retained penetration of between 45 and 55%, more preferably between 48 and 53%, most preferably of about 51% as determined by the AASHTO T 49 standard test for penetration of bituminous materials.

Asphalt obtained by a method according to the invention preferably has a thin layer assay waste ductility of between 80 and 95 cm, more preferably of between 85 and 90 cm, most preferably of about 88 cm as determined by the AASHTO T 51 standard test for ductility of asphalt materials.

If the solid waste material used in a method of the invention consists essentially entirely of organic material, asphalt is obtained that has a content of inorganic substances of below 1%. Such asphalt according to the invention preferably has a sulphur content of below 0.5%, more preferably below 0.1%. If the organic solid waste material used in a method of the invention comprises inorganic substances, the asphalt obtained may comprise said inorganic substances. However, the concentration of said inorganic substances is typically lower than the maximal tolerably content of said substances.

In a preferred embodiment the invention provides a product obtainable from step d) of a method according to the invention, wherein said product is liquid hydrocarbon. Liquid hydrocarbon is herein defined as an organic compound in liquid form. Preferred examples of liquid hydrocarbon include, but are not limited to, methyl alcohol, diesel with cetanes, gasoline with octanes, benzene, kerosene, and other fuel varieties. Liquid hydrocarbon obtained with a method according to the invention is essentially free of sulphur.

In another preferred embodiment the invention provides a product obtainable from step e) of a method according to the invention, wherein said product is an organic acid. Organic acids are herein defined as acids made up of molecules containing organic radicals. Preferred examples of organic acids include, but are not limited to, acetic acid, formic acid, citric acid, butyric acid, maleic acid and benzoic acid. For instance, depending on the solid waste material, organic acids obtained in step e of a method of the invention may comprise between 5% and 20% of formic acid, between 75% and 95% of acetic acid, between 0% and 11% of citric acid and between 0% and 4% of other organic acids.

In another preferred embodiment the invention provides a product obtainable from step e) of a method according to the invention, wherein said product is methane gas or hydrogen.

An apparatus arranged for performing a method according to the invention is also provided. Said apparatus, herein also called the Organic Matter Reactor, converts waste materials through molecular transformation into fuels, and can be energetically self-sufficient. An example of an apparatus according to the invention is depicted in FIGS. 1 and 2.

An apparatus arranged for performing a method according to the invention, comprises an inlet for waste (1), for feeding waste materials into at least one reaction and disintegration vessel (2), which is heated by a heat source to apply irradiation with macro waves and is adapted for carrying out step b) of the method according to the invention, said at least one reaction and disintegration vessel (2) comprising an inlet for reagents and/or alkali-reagents, an outlet for coal and an outlet for residual material in gaseous state, which outlet is operably linked to at least one reaction and selection vessel (3) for carrying out step c) of the method according to the invention, said at least one reaction and disintegration vessel (3) comprising an inlet for reagents and/or alkali-reagents, an outlet for asphalt (3a) and an outlet for residual material in gaseous state, which outlet is operably linked to at least one reaction and selection vessel (4) for carrying out step d) of the method according to the invention, said at least one reaction and disintegration vessel (4) comprising an inlet for reagents and/or alkali-reagents, an outlet for liquid hydrocarbon (4a) and an outlet for residual material in gaseous state, which outlet is operably linked to at least one reaction and selection vessel (5) for carrying out step e) of the method according to the invention, said at least one reaction and disintegration vessel (5) comprising an inlet for reagents and/or alkali-reagents, an outlet for organic acids (5*a*), an outlet for residual material in gaseous state, which outlet is operably linked to smoke decontaminator (8), comprising an outlet for water vapour and carbon dioxide, and which is operably linked to refrigerator and recycler (10) and reaction vessel (9) for carrying out a rectification step, wherein said at least one reaction and disintegration vessel (5) is further operably linked to anti-explosive safety valves (6) for maintaining stable pressure and prevent flame return, which anti-explosive safety valves (6) are operably linked to gas storage vessel (7).

The invention is further explained in the following examples. These examples do not limit the scope of the invention, but merely serve to clarify the invention.

EXAMPLES

Example 1

Figure 1:
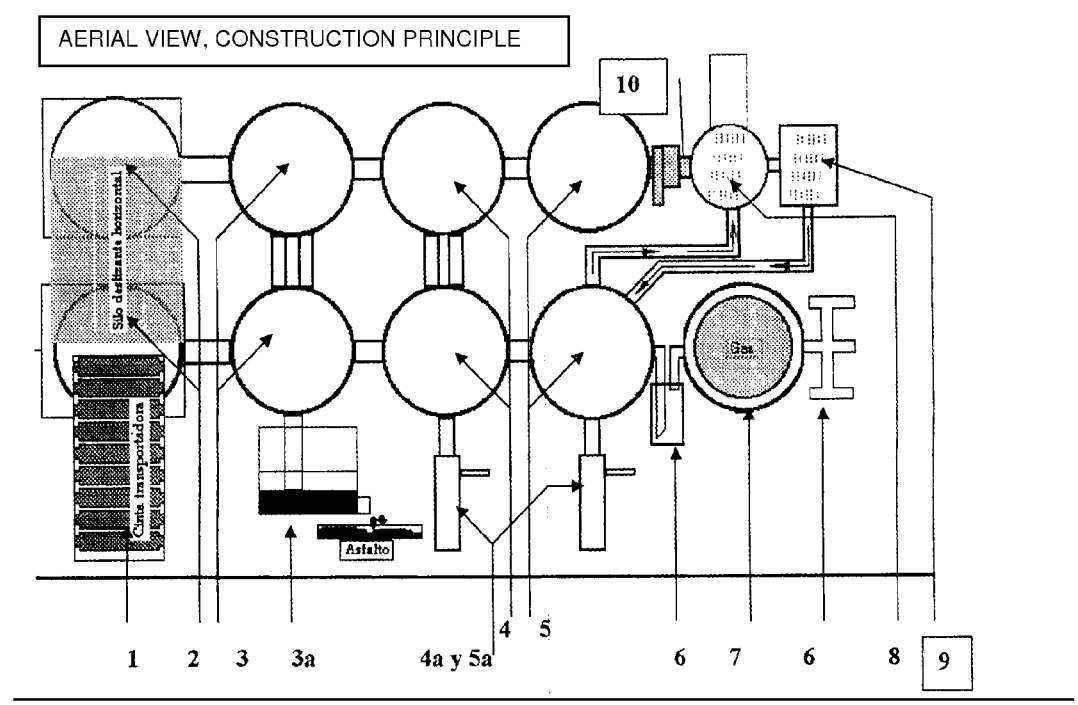
FIG. 1. Aerial view of an apparatus arranged for performing a method according to the invention. 1) inlet for waste; 2) reaction and disintegration vessels for carrying out step b) of the method according to the invention; 3) reaction and selection vessels for carrying out step c) of the method according to the invention; 3*a*) outlet for asphalt; 4) reaction and selection vessels for carrying out step d) of the method according to the invention; 4*a*) outlet for liquid hydrocarbon; 5) reaction and selection vessels) for carrying out step e) of the method according to the invention; 5*a*) outlet for organic acids; 6) anti-explosive safety valves for maintaining stable pressure and prevent flame return; 7) gas storage vessel; 8) smoke decontaminator capable of releasing water steam and $CO_2$; 9) reaction vessel for carrying out a rectification step; 10) refrigerator and recycler.
Figure 2:
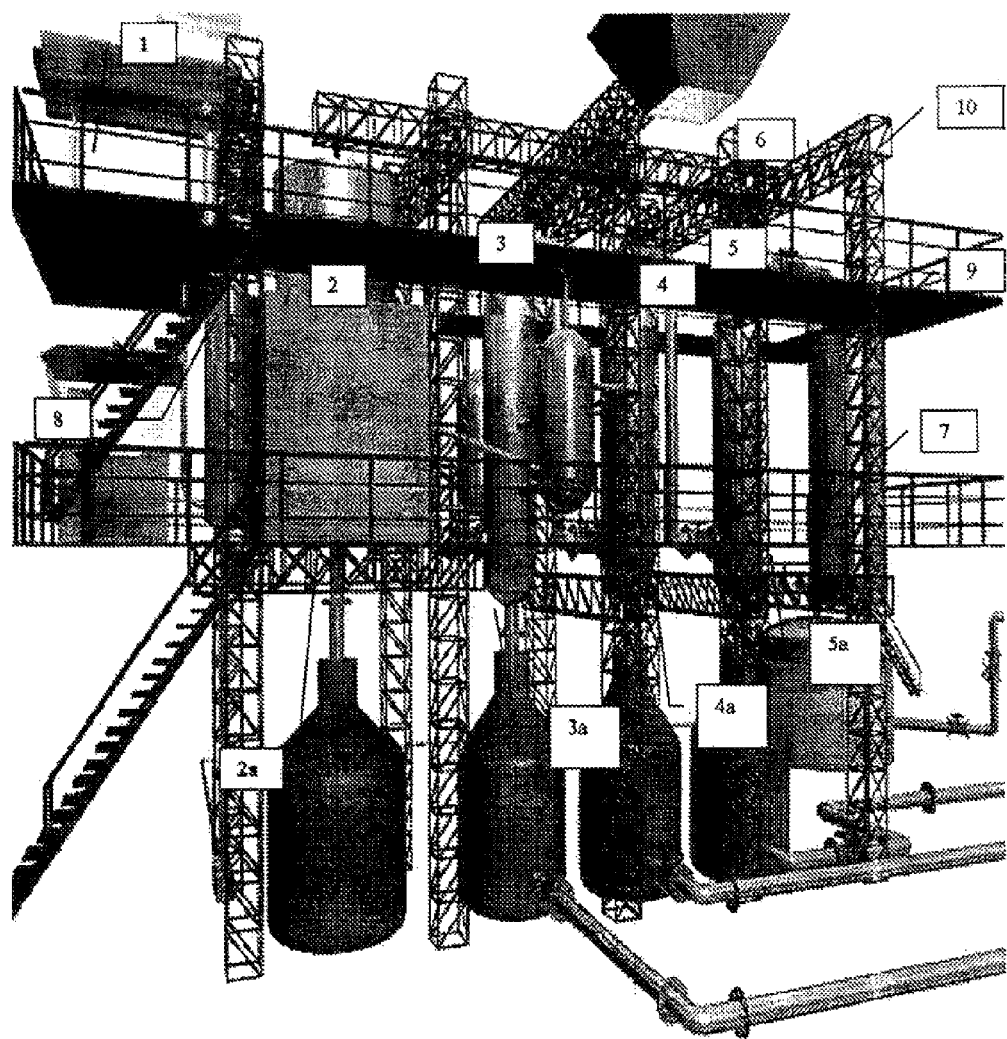
FIG. 2. Side view of an apparatus arranged for performing a method according to the invention. Numbering of the parts according to FIG. 1.

Processing of Municipal Solid Waste Residues (MSW) with a RMO Process

The present example of the RMO process was applied on organic matter originating from the MSW. 200 kg of organic material was separated and process in an RMO apparatus. The composition of the MSW is indicated in table 1. The first column of table 1 indicates the part of the waste that is processed into a useful product during the performance of the RMO process. The second column of table 2 indicates the part of the material that is not processed into products but that is sterilized during the RMO process.

1. Municipal Solid Waste Residues

Solid waste (MSW) is obtained from waste incurred in private homes, shops, offices and services as well as all those who are not classified as hazardous and which by its nature or composition can be compared to those produced in previous places or activities. The composition of the municipal waste was as follows:

1.1 Composition

MSW always have variations in the proportions of the different materials. The following is a representative sample of the general composition of municipal solid waste. It has been classified prior to separation into organic and inorganic. Only organic materials have been processed in this example.

TABLE 1

| Components of processed organic matter | | |
|---|---|---|
| Processed material (transformed into product) TOTAL WET WEIGHT 200 Kg TOTAL DRY WEIGHT 163.4 kg (18.3% humidity) | | Material not demolecularized but sterilized |
| Paper and cardboard. Newspapers, magazines, cardboard packaging, paper containers, cardboard, etc. | 19% 38 Kg. | Glass: glass containers, jars, bottles, etc. |
| Organic remains. These are the remains of food, gardening, etc. | 36% 72 g. | Metals. Cans are the remains of tools, kitchen utensils, furniture etc. |
| Textiles. Clothing and apparel and home decorative items. | 6% 12 Kg. | Furnishings and abandoned vehicles. |
| Waste from street cleaning, parks, playgrounds and beaches. | 17% 34 Kg. | Building debris. |
| Dead pets, and furniture | 4% 8 Kg. | Waste and debris from construction works and minor home repair |
| Wood. In the form of furniture and boxes. | 3% 6 Kg. | |
| Plastics. In the form of packaging and of other nature | 15% 30 Kg. | |

Other waste produced in households which are, because of their toxicity, are considered hazardous waste. Such waste was not part of this example but can also be treated separately with the RMO process. Because they require special care for safety reasons, they are treated separately:

Mineral oils. Product from vehicles.
Vehicle batteries.
Waste from electronic equipment. Mobile phones, computers, etc.
Household appliances. May contain CFCs, harmful to the ozone layer.
Drugs.
Batteries.
Chemicals in the form of paints, glues, solvents, waxes, etc.
Thermometers.
Fluorescent lamps and light bulbs.

2 Characteristics and Composition of the Materials Provided to the Process.

2.1 Paper

For the raw material, trees are peeled, sliced and in the process of digestion pasta is obtained. This is washed and bleached, and then proceeds to the manufacture of paper or cardboard. It is for instance used as newspaper, packaging, packaging, etc. It's participation in the waste stream is high due to its large consumption per capita per year.

Paper forms 11% of the total composition of MSW.

2.2. Plastics.

These materials have been recently incorporated into our civilization during the last half century. Widely used in virtually every industry for its versatility, ease of fabrication, low cost, resistance to environmental factors, transparency, etc.

The plastic is obtained by combining one or more polymers, with additives and fillers, in order to obtain a material with specific properties.

Polymers are synthetic macromolecules whose structural unit is a monomer. A large number of olymerization reactions form the macromolecule.

They are composed of organic nature, and their composition essentially consists of carbon and hydrogen, and other elements in lesser proportions, such as oxygen, nitrogen, chlorine, sulfur, silicon, phosphorus, etc.

They can be obtained from natural resources, renewable or not, although it should be noted that all commercial polymers are derived from petroleum.

The polymers are natural materials derived from oil industry by synthesis reactions, which makes them a very resistant material and virtually unalterable.

This last feature causes them to remain in landfills for long periods after diposal.

There are three main groups of polymers:
Thermoplastics,
Thermosets,
Elastomers.

Thermoplastic polymers soften when heated, leading to flow, and when the temperature drops again they become solid and rigid. This property is caused by disordered macromolecular chains, linked only by weak Van der Waals forces. They are best used in the packaging industry.

Among the thermoplastic polymers are:
Polyolefins. Further divided into:
1. LDPE (low density polyethylene).
2. HDPE (high density polyethylene).
3. PP (polypropylene).
PVC (polyvinyl chloride).
PS (polystyrene).
PET (polyethylene terephthalate)

Thermosetting polymers do not soften or flow when heated, but break down if the temperature continues to rise. Therefore they cannot be molded repeatedly. They consist of macromolecular chains linked together by strong covalent bonds.

Among the thermosetting polymers are:
Phenolic resin.
Amino-resins.
Polyester Resins.
Epoxy resins.
Polyurethanes.

Finally, the elastomeric polymers have their chains linked by strong covalent bonds. Their structure makes them easy to deform by an external force, and immediately retrieve the original size and/or shape when the external force is removed.

Examples are:
NR (natural rubber).
SBR (synthetic rubber butadiene-styrene).
EPM-EPDM (rubber saturated styrene-propylene).
CR (chloroprene rubber).
Plastics constitute 8% of the total composition of MSW.

2.3 Tetrapack Containers

Its marketing began in 1963. Multi-material containers are formed by a sheet of cardboard, aluminum and other plastics.

They are made from paper and cardboard and imprinted with commercial design. Subsequently they are laminated with aluminum foil and finally with polyethylene film. The rolls of material thus obtained is applicable for the manufacture of packaging containers.

The RMO process is an optimal method for treating this material. The plastic film and cardboard are separated completely by the radiolysis process and converted to photon targeted coal, fuel gas, asphalt, acids and fuel. The aluminum foil that does not undergo oxidation by both weight loss within the process is removed.

2.4. Organic Debris.

Organic debris are the remains of food, cooked or not, and garden waste, etc. Its chemical composition is well known: amongst other fats, carbohydrates, proteins.

Organic matter accounts for 50% of household waste.

2.5. Textiles, Wood Organic Waste.

Textiles, wood and furniture are the last fraction of MSW. They are not harmful in themselves, but may cause a problem due to their size. Such is the case of mattresses, furniture, etc. These materials were not part of the present example but can be fully processed with the RMO process.

2.6. Other Waste.

This group is of heterogeneous composition and many components can be processed safely in the RMO process separately and/or supplemented with other methods. They are not part of this example, because they need special attention, since some may constitute hazardous waste.

The different laws in different countries contain specific rules governing PCBs, waste oils and batteries due to its polluting nature. Polyclorinated trifenyls and polychlorinated biphenyls (PCBs) are used as thermal or hydraulic fluids and are present in refrigerators.

Batteries are electrochemical devices that can convert chemical energy into electricity. They may contain hazardous materials like mercury, cadmium, zinc, lead, nickel and lithium. There are several types:
Alkaline.
Carbon-zinc.
Lithium button.
Mercury button and cylindrical.
Cadmium-nickel.
Silver button.
Zinc button.

A single mercury oxide battery can contaminate 2 million gallons of water to levels harmful to health.

Not all batteries have the same potential to pollute. Some are recycled as mercuric oxide, silver oxide and nickel-cadmium, but others do not, such as alkaline and zinc-lead. These should be taken to special deposits.

Fluorescent tubes and energy saving bulbs contain mercury and should not be removed with the rest of MSW.

Disposition of medicines of heterogeneous composition endanger the environment when mixed with other waste and untreated apart.

Mineral oils containing phenols, chlorinated compounds, PCBs, etc. are highly polluting if discharged into water, soil, or improperly treated so as to produce emissions to the atmosphere.

Paints, solvents, varnishes, cleaning products, developing solutions, etc. are hazardous waste and once collected need to receive a specific treatment.

Electronic devices are a problem for the large volume generated after disposal, have a long duration and are increasingly widespread.

Finally, part of non-hazardous waste are household vegetable oils (olive, sunflower, corn). After they are degraded by their use, such as for frying, have become. Although not considered as hazardous, they should never be poured down the drain because of their ability to form films on water that hinder proper oxygenation in the purification of waste water.

3. RMO Process.

3.1. Initial Conditions

The empty reaction vessel for performing phase b) had an internal temperature of 383° C., the reaction vessel for performing phase c) a temperature of 191° C., the reaction vessels for performing phase d) had a temperature of 98° C., the reaction vessel for performing phase e) had a temperature 10° C. All reaction vessels had atmospheric pressure.

The weight of organic matter is indicated in Table 1 (first column). The total weight of the material was 200 kg with a 18.3% moisture content. The organic material was introduced at the bottom of the reactor, in the process vessel (inner wall) that is subsequently inserted into the RMO apparatus into the outer vessel of phase b). The outer wall of the reaction vessel was in contact with the burner.

3.2. Process Report

8:13 a.m.: loading of the material into the RMO apparatus. The internal reaction vessel allows a tight seal that resists the pressure as a result of the presence of safety explosion-hydraulic valves.

The implementation of the photon radiation is monitored using meters measuring the internal temperature of the material. Gasification is initiated at a pressure of 1.015 bar, showing a peripheral temperature of 207.5° C. of the material. This temperature was increased by applying infrared photon radiation at a rate of 10.4° C. per minute on average for the first hour of the process. This increase was more rapid initially (21° C. per minute for the first 12 minutes). The internal pressure of the system also increased slowly with increasing temperature.

08:15 am: The process proceeded simultaneously in all reaction vessels of the RMO apparatus.

An internal pressure of 1.034 bar was registered. As the first product a gaseous mixture of a combustible gas was produced consisting of 48% CO, 23% water vapour and 29% air which, during the first 10 minutes, was used as feedback to the burners in a mixture of one volume part of gas poor in methane and three volume parts of gas rich in methane gas.

08:23 am: 8 minutes after the start of the process precipitation of discharged acid from reaction vessel e) was observed. The discharge of liquid hydrocarbon and asphalt had not yet started. The discharge rate of the acid gradually increased. The composition of the produced gas reaches the appropriate levels for storage and/or direct application to fuel burners for the performing the RMO process.

08:31 am: 16 minutes after the start of the process the first discharge of liquid hydrocarbon in reaction vessel d) was observed. Meanwhile the discharge of acid kept increasing. Discharge of asphalt had not yet started. The discharge rate of liquid hydrocarbon also gradually increased.

09:08 am: 53 minutes after the start of the process discharge of fluid asphalt from reaction vessel b) was initiated. Meanwhile discharge of acid and liquid hydrocarbon reached and maintained at peak level.

At this time, the organic starting material has a uniform temperature of 835° C. The pressure inside the system reached its maximum value in this process of 1.077 bar. From this moment the external application of energy for the process was slowed down because the photon radiation field was generated across all the organic matter.

The discharge of asphalt production still increased while the discharge of other products gradually reduced.

10:30 am: the discharge of gas was reduced to a minimum while discharge of the other products continued. The pressure inside the system recorded its lowest value in this process of 1.029 bar.

At the bottom of the reaction vessel of phase b) water vapour at a rate of 1 m3 per minute for 10 to 15 minutes was introduced while the burner was stopped to let the heat of the waste generate gases such as hydrogen and $CO_2$.

This speeded up the discharge of asphalt, acids and liquid hydrocarbons of organic material, which by then was charred and the temperature was gradually reduced from the 835° C. to 400° C. The discharge was obtained from the three precipitators. The discharged gas was at this moment determined to be hydrogen H and $CO_2$ and high amounts of methane.

10:43 a.m.: the process ended when a temperature of 400° C. was registered. At this point the injection of water vapour was stopped.

10:50 a.m.: the vessel containing the coal was extracted and this vessel was cooled for 4 hours before discharge.

10:55 am: at this time the RMO apparatus is available for the start of a new process by introducing a new vessel loaded with a new organic matter.

4. Mass Balance of the RMO Process

| MASS BALANCE | | | | |
|---|---|---|---|---|
| DESCRIPTION OF PRODUCTS | Quantity (kg). | % of total WET WEIGHT | % of total DRY WEIGHT | COMMENTS |
| ECO fuel gas (methane and others) | 27.2 | 13.60% | 16.65% | Gas density: 0.48 kg/m3 |
| Asphalt | 6.2 | 3.10% | 3.79% | |
| Hydrocarbon | 32 | 16.00% | 19.58% | |
| Organic acids | 35.4 | 17.70% | 21.66% | |
| Coal | 62.6 | 31.30% | 38.31% | |
| Water | 36.6 | 18.30% | | |
| Total | 200 | 100.0% | 100.00% | |

Example 2

Processing of Organic Material from Municipal Solid Waste Residues (MSW) with a RMO Process INPUT: dry organic material from municipal solid waste
Observation: The organic starting material was crushed and pre-dried resulting in a residual moisture content of 11.01%

| DESCRIPTION | UNITY | QUANTITY | % OF WET INPUT | % OF DRY INPUT (WEIGHT %) |
|---|---|---|---|---|
| humid quantity of the input | Kg | 72.60 | 100.00% | 112.37% |
| COMPOSITION OF INPUT | Kg | 64.61 | 88.99% | 100.00% |
| Food residues and fruit peels | Kg | 22.21 | 30.59% | 34.38% |
| Plastics (polyethylene, PVC, etc.) | Kg | 13.45 | 18.53% | 20.82% |
| Paper and carton | Kg | 13.75 | 18.94% | 21.28% |
| Garden waste (biomasa) | Kg | 15.20 | 20.94% | 23.53% |
| Water content of moisture | Kg | 7.99 | 11.01% | 12.37% |

| COMPOSITION OF OUTPUT | UNITY | QUANTITY | % OF WET INPUT | % OF DRY INPUT (WEIGHT %) |
|---|---|---|---|---|
| coal | Kg | 22.35 | 30.79% | 34.59% |
| asphalt | Kg | 3.04 | 4.19% | 4.71% |
| Liquid hydrocarbon | Kg | 15.04 | 20.72% | 23.28% |
| Organic acid | Kg | 14.22 | 19.59% | 22.01% |
| combustible gas | Kg | 9.96 | 13.72% | 15.42% |
| Water content of the moisture | Kg | 7.99 | 11.01% | |
| TOTAL OUTPUT OF USEFULL PRODUCTS | Kg | 64.61 | | 100.00% |

Examples 3

Molecular Fragmentation Using the RMO of Cotton Seed Treated with Insecticides—and Transformation to Coal Identification of the Sample Cotton seed sample identity

| Sample | Treated with | Agricultural season/year | Quantity of Sample (g) |
|---|---|---|---|
| Sample 1 | Imidacloprid 70% | 2001 | 500 |
| Sample 2 | Carbosulfan + Vitavax Carbosulfan + (Carboxin + Thiram) | 1997 | 500 |

Analysis of insecticides in cotton seed sample

| Sample | Active Ingredient | Result (mg/kg) | Detection Limit (mg/kg) | Analysis Method |
|---|---|---|---|---|
| Sample 1 | Imidacloprid | 81 | 10 | HPLC |
| Sample 2 | Carbosulfan | 2820 | 2 | GC-MS |
|  | Carboxin | 243 | 1 | GC-MS |
|  | Thiram | Not detected | 10 | GC-MS |

Rmo Process

The cotton seed samples were subjected to the RMO process. The product obtained was coal.

Results of Analysis of Insecticides of the Coal Product of the Demolcularisation of the Cotton Seed Samples Using a RMO Process Analysis of insecticides in coal product obtained from cotton seed samples

| Sample | Active Ingredient | Result (mg/kg) | Detection Limit (mg/kg) | Analysis Method |
|---|---|---|---|---|
| Sample 1 | Imidacloprid | Not detected | 10 | HPLC |
| Sample 2 | Carbosulfan | 36 | 2 | GC-MS |
|  | Carboxin | 2 | 1 | GC-MS |
|  | Thiram | Not detected | 10 | GC-MS |

Determination of contents of fixed carbons, ash and volatile substances in the coal product of cotton seed sample 1.

| Determinations | Unity | Obtained values |
|---|---|---|
| Ash | % | 12.6 |
| Volatile materials | % | 20.8 |
| Fixed carbon | % | 66.6 |

Evaluation of the Results of Analysis of the Produced Coal

Carbosulfan a trace of 1.27% corresponding to 36 mg/Kg., of the initial concentration, was present after the RMO process.

Carboxin a trace of 0.82% corresponding to 2 mg/Kg., of the initial concentration, was present after the RMO process.

The invention claimed is:

1. A method for producing a product comprising: coal, asphalt, liquid hydrocarbon, organic acids, methane gas and/or hydrogen from a waste material, the method comprising:
   a) providing a waste material; and
   b) subjecting the waste material to irradiation with low frequency macro waves, with a wavelength of between 700 nm and 1 mm, at a temperature of between 205° C. and 900° C. and a pressure of between 1.0 bar and 19.0 bar, thereby producing product;
   wherein said waste material has a composition with a carbon content of 9-85%, a hydrogen content of 1-15% and an oxygen content of 0-65% based on dry weight of the waste material.

2. A method for treating a waste material, the method comprising:
   providing a waste material, and subjecting the waste material to irradiation with low frequency macro waves, with a wavelength of between 700 nm and 1 mm, at a temperature of between 205° C. and 900° C. and a pressure of between 1.0 bar and 19.0 bar,
   wherein said waste material has a composition with a carbon content of 9-85%, a hydrogen content of 1-15% and an oxygen content of 0-65% based on dry weight of the material.

3. The method according to claim 1, wherein:
   said irradiation is performed in the presence of cellulose or a cellulose derivative, a carbon compound, and/or water.

4. The method according to claim 1, wherein residual material in a gaseous state is further produced in step b), the method further comprising:
   separating the product obtained in step b) from the residual materials in gaseous state.

5. The method according to claim 1, further comprising precipitating inorganic substances during step b) utilizing alkali-reagents that are added to the reaction mixture.

6. The method according to claim 1, wherein the waste material comprises at least 50% organic material.

7. The method according to claim 1, wherein the waste material comprises plant leaves and branches, fruit peel, husk and shells of cereals and oilseeds, food leftovers, spurge, jatropha curcas plant and/or sugar cane bagasse, vegetable refuse, and/or all other organic waste from agroindustrial waste, pruning waste, weeds and/or all types of vegetable, solid waste of animal origin, plastic, paper, rubber, tires, natural and synthetic fabric, latex, diapers and/or disposable towels.

8. The method according to claim 1, wherein the waste material comprises inorganic components.

9. The method according to claim 1, wherein the waste material comprises tires, tetra pack containers and/or galvanized metals.

10. The product of step b) of the method according to claim 1, wherein said product is coal.

11. A product produced by a method comprising:
    a) providing a waste material;
    b) subjecting the waste material to irradiation with low frequency macro waves, with a wavelength of between 700 nm and 1 mm, at a temperature of between 205° C. and 900° C. and a pressure of between 1.0 bar and 19.0 bar; and
    c) subjecting residual materials in gaseous state from step b) to a physicochemical reaction in the presence of solid ferrous metal at a temperature of between 180° C. and 500° C. and a pressure of between 0.98 bar and 5.5 bar, thereby producing asphalt.

12. The product according to claim 11, wherein sulphur content of the asphalt is below 0.5%.

13. The product of claim 11, wherein the asphalt has a solubility in carbon tetrachloride of between 98% and 99.9% and an ash content of between 0.1% and 1.0%, and wherein the asphalt shows a negative test result when subjected to Oliensis spot testing.

14. The method according to claim 1, wherein residual material in gaseous state is further produced in step b), the method further comprising:
  c) subjecting the residual materials in gaseous state from step b) to a physicochemical reaction in the presence of a solid ferrous metal, at a temperature of between 180° C. and 500° C. and a pressure of between 0.98 bar and 5.5 bar, thereby producing asphalt.

15. The method according to claim 1, wherein residual material in gaseous state is further produced in step b), the method further comprising:
  c) subjecting the residual materials in gaseous state from step b) to a physicochemical reaction and/or condensation, at a temperature of between 150° C. and 750° C. and a pressure of between 0.96 bar and 200 bar, thereby producing liquid hydrocarbon.

16. The method according to claim 14, wherein residual material in a gaseous state is further produced in step c), the method further comprising:
  d) subjecting the residual materials in gaseous state from step c) to a physicochemical reaction and/or condensation, at a temperature of between 150° C. and 750° C. and a pressure of between 0.96 bar and 200 bar, thereby producing liquid hydrocarbon.

17. The method according to claim 1, wherein residual material in a gaseous state is further produced in step b), the method further comprising:
  c) subjecting the residual materials in gaseous state from step b) to a physicochemical reaction in the presence of solid copper, at a temperature of between 50° C. and 150° C. and a pressure of 0.95 bar and 1.5 bar, thereby producing organic acids.

18. The method according to claim 14, wherein residual material in a gaseous state is further produced in step c), the method further comprising:
  d) subjecting the residual materials in gaseous state from step c) to a physicochemical reaction in the presence of solid copper, at a temperature of between 50° C. and 150° C. and a pressure of 0.95 bar and 1.5 bar, thereby producing organic acids.

19. The method according to claim 16, wherein residual material in a gaseous state is further produced in step d), the method further comprising:
  e) subjecting the residual materials in gaseous state from step d) to a physicochemical reaction in the presence of a solid copper, at a temperature of between 50° C. and 150° C. and a pressure of 0.95 bar and 1.5 bar, thereby producing organic acids.

20. The method according to claim 1, wherein residual material in a gaseous state is further produced in step b), the method further comprising:
  c) subjecting the residual materials in gaseous state from step b) to an absorbent wash and cooling at room temperature, thereby producing methane gas and hydrogen.

21. The method according to claim 14, wherein residual material in a gaseous state is further produced in step c), the method further comprising:
  d) subjecting the residual materials in gaseous state from step c) to an absorbent wash and cooling at room temperature, thereby producing methane gas and hydrogen.

22. The method according to claim 16, wherein residual material in a gaseous state is further produced in step d), the method further comprising:
  e) subjecting the residual materials in gaseous state from step d) to an absorbent wash and cooling at room temperature, thereby producing methane gas and hydrogen.

23. The method according to claim 19, wherein residual material in a gaseous state is further produced in step e), the method further comprising:
  f) subjecting the residual materials in gaseous state from step e) to an absorbent wash and cooling at room temperature, thereby producing methane gas and hydrogen.

24. The method according to claim 23, further comprising performing thermal reduction of water between step e) and f).

25. The method according to claim 19, wherein:
  step c) is performed in the presence of a hydrocarbon or a mixture of hydrocarbons;
  step d) is performed in the presence of a hydrocarbon or a mixture of hydrocarbons, and/or an oxidizing agent; and/or
  step e) is performed in the presence of an organic acid solution of between 5% and 40%, and/or a solid metal, and/or an iron sulphate solution in a concentration of between 5% and 50%.

26. The method according to claim 23, wherein residual materials are further produced in step f), the method further comprising:
  separating asphalt obtained in step c), from the residual materials in gaseous state,
  separating the liquid hydrocarbon obtained in step d) from the residual materials in gaseous state,
  separating the organic acids obtained in step e) from the residual materials in gaseous state, and/or
  separating the methane gas and hydrogen obtained in step f) from the residual materials.

27. The method according to claim 19, further comprising precipitating inorganic substances during step b), step c), step d), and/or step e), utilizing alkali-reagents that are added to the reaction mixture.

28. The method according to claim 7, wherein the vegetable refuse is refuse of tobacco, cotton, sawdust, shaving, and/or all waste from the timber industry.

29. The method according to claim 7, wherein the solid waste of animal origin is bones, manure, solid waste from the meat industry, and/or any other type of waste of animal origin.

* * * * *